Dec. 2, 1924.
J. E. MANQUEN
1,518,089
CHANGE SPEED MECHANISM FOR DRILLING MACHINES OR THE LIKE
Filed Sept. 13, 1920
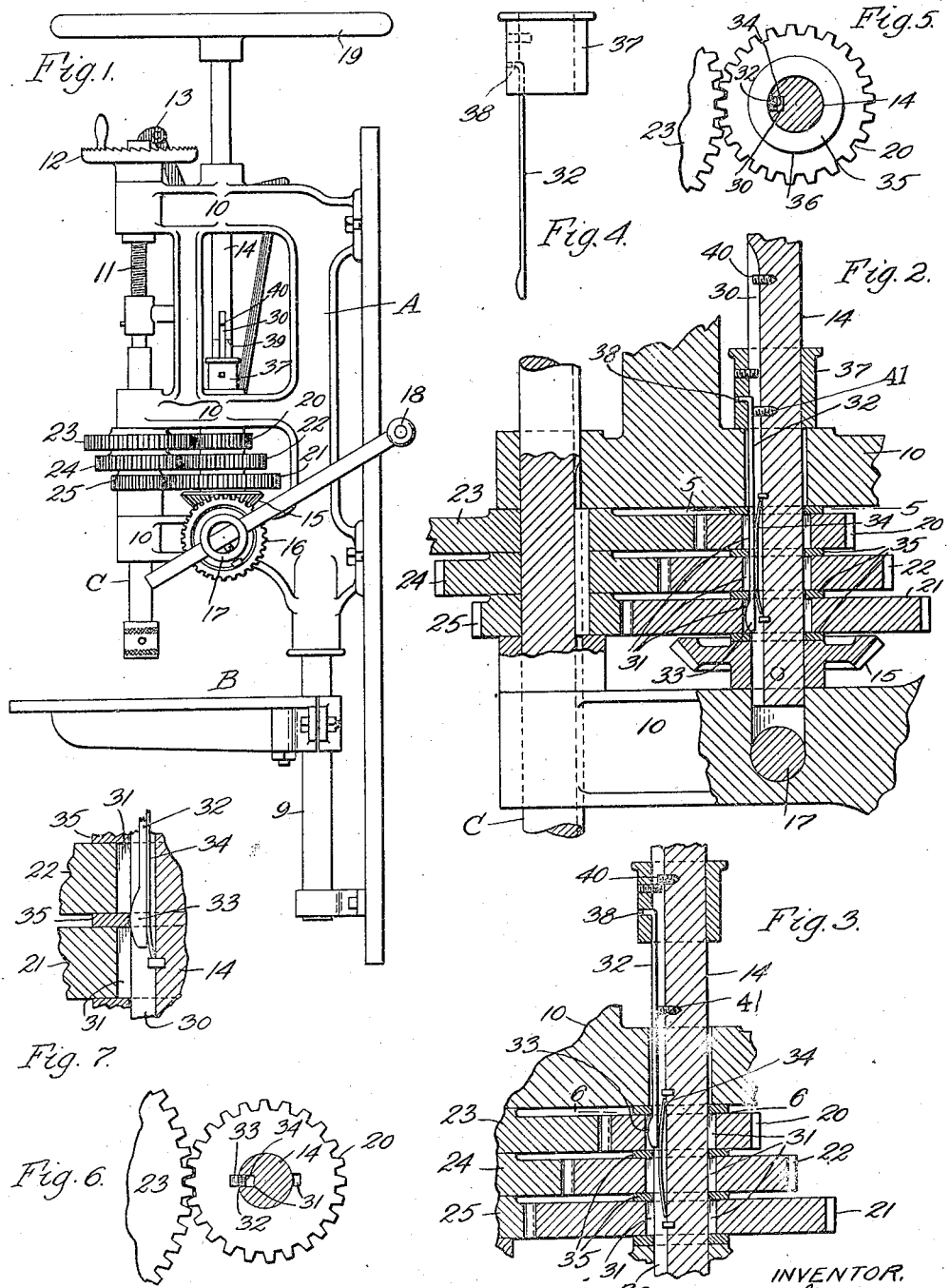
INVENTOR.
John E. Manquen
by Parker & Brockers
ATTORNEYS.

Patented Dec. 2, 1924.

1,518,089

UNITED STATES PATENT OFFICE.

JOHN E. MANQUEN, OF BUFFALO, NEW YORK, ASSIGNOR TO BUFFALO FORGE COMPANY, OF BUFFALO, NEW YORK.

CHANGE-SPEED MECHANISM FOR DRILLING MACHINES OR THE LIKE.

Application filed September 13, 1920. Serial No. 409,908.

*To all whom it may concern:*

Be it known that I, JOHN E. MANQUEN, a citizen of the United States, residing at Buffalo, in the county of Erie and State of New York, have invented a new and useful Improvement in Change-Speed Mechanisms for Drilling Machines or the like, of which the following is a specification.

This invention relates to change speed mechanisms which may be used on drilling machines of the kind commonly employed for drilling metal or the like, or on analogous machines.

The objects of the invention are to produce a simple and very compact mechanism of this sort by means of which three or more speeds are provided within the space usually required for producing a smaller number of speeds, and in which no shifting of gears is necessary.

In the drawings:

Fig. 1 is an elevation of a drilling machine provided with a speed change mechanism embodying the invention.

Fig. 2 is a fragmentary sectional elevation thereof on an enlarged scale showing the speed change mechanism and its connection with the tool spindle.

Fig. 3 is a similar view thereof showing the mechanism set to produce a different speed.

Fig. 4 is a detached elevation of the shiftable key for connecting the desired gear to the vertical countershaft, together with the sliding sleeve for actuating the key.

Fig. 5 is a fragmentary horizontal sectional view thereof on line 5—5 Fig. 2.

Fig. 6 is a similar view thereof on line 6—6 Fig. 3.

Fig. 7 is a fragmentary vertical section on a still larger scale, and showing an intermediate position of the shiftable key.

The speed change mechanism embodying the invention may be applied to a machine of any suitable sort, a hand driven drilling machine being shown in the drawings. This machine comprises a frame A provided with a guide rod or post 9 to which a work supporting table B may be adjustably secured. A vertical tool spindle C is rotatably and slidably mounted on bearings on the outer ends of lateral arms 10 of the frame A. The tool spindle is fed or moved downwardly to advance the tool into the work by a feed screw 11 journalled on the frame A and rotated by a hand wheel 12, or by an automatic ratchet feed device 13 which is actuated in a well known manner. A vertical countershaft 14 is also journalled in the arms 10 of the frame A and its lower end is provided with a bevel gear 15 adapted to mesh with a bevel gear 16 on a horizontal drive shaft 17. A handle 18 on one end of the drive shaft may be used for rotating the same. Any other suitable means for rotating the drive shaft 17 may be used.

The countershaft 14 is preferably provided at its upper end with any usual or suitable fly wheel 19 as shown. The parts of the machine thus far described are of the usual or any suitable construction and of themselves form no part of the invention.

The change speed mechanism shown in the drawings preferably includes a plurality of spur gears loosely arranged on the countershaft 14, such as an upper gear 20, lower gear 21 and an intermediate gear 22. These gears are adapted to mesh with a corresponding number of gears 23, 24 and 25 and placed on the tool spindle C. The gears 20, 21 and 22 are adapted to rotate freely on the countershaft 14 and are so formed that any desired one of them may be operatively connected to the countershaft so as to be directly rotated thereby. The gear thus connected will rotate the tool spindle C through the gear with which it is in mesh, for instance, if the gear 21 (see Fig. 2) is operatively connected to the shaft 14, the tool spindle C will be rotated at a definite speed relatively to the speed of rotation of the countershaft by the gear 25, and the gears 23 and 24 also splined on the tool spindle C will rotate therewith. Consequently the gears 20 and 22 on the countershaft 14 will rotate freely on this shaft. In the construction shown, three different speeds of the tool spindle may be obtained by placing one or another of the gears 20, 21 or 22 into operative connection with the countershaft, the gear which may be connected thereto always constituting the driving gear for the tool spindle C through the gear on the tool spindle with which it meshes.

The means shown in the drawings for operatively connecting either the upper gear 20, lower gear 21 or intermediate gear 22 to the shaft 14 are preferably constructed as follows:

The countershaft 14 is provided with a longitudinal keyway or groove 30 and each of the gears 20, 21 and 22 is provided with one or more keyways 31. A movable key or latch 32, arranged in the keyway of the countershaft is provided at its lower end with an enlargement or lug 33. The keyway or groove 30 in shaft 14 preferably extends a distance above the intermediate arm 10, so that key 32 may be removed from the gears and keyway without removing shaft 14 from its bearings. The key 32 is adapted to be normally pressed outwardly away from the bottom of the keyway 30, by any suitable means, such as a leaf spring 34, to move the enlargement 33 of the key into one of the keyways 31 of one or another of the gears 20, 21, or 22. Means are preferably provided for preventing the key from connecting more than one gear at one time to the countershaft and for facilitating the placing of the enlargement 33 of the slidable key into engagement with one or another of the gears on the countershaft. For this purpose spring-compressing rings or washers 35 are placed between the gears of the countershaft, and the enlargement 33 of the key 32 is provided with inclined faces at opposite ends. The holes in the rings 35 are substantially of the same diameter as the countershaft 14 and consequently when the enlargement 33 of the key 32 is moving from engagement with one of the gears into engagement with the adjacent gear, the moving of the projection 33 past one of the rings 35 will cause the projection to be moved inwardly out of engagement with any of the gears. During this inward movement of the key the spring 34 is compressed and the enlargement 33 of the key is entirely confined within the keyway 30 of the countershaft as shown in Fig. 7. Then by moving the key either up or down from the position shown in Fig. 7 the enlarged portion thereof will be moved into engagement with the corresponding gear and when the keyway 31 in the gear is moved into registration with the keyway 30 in the countershaft, the enlargement 33 of the key will snap into engagement with the keyway 31. The spring-compressing rings or washers 35 and the spring 34 also have the advantage of yieldingly retaining the key in engagement with one or another of the gears.

For actuating the key 32 a sliding sleeve 37 or the like is preferably provided on the shaft 14 and to which the key is connected in any suitable manner. In the construction shown, the key is provided with a bent upper end 38 which is secured in a hole in the sleeve. The engagement of the bottom of the sleeve 37 with the arm 10 indicates the proper position for the key when it is desired to connect the lower gear 21 with the shaft 14 and a line or mark 39 and a pin 40 on the shaft 14 indicate respectively the proper positions for the key when it is desired to engage either the intermediate gear 22 or the upper gear 20. The bent end 38 of the key 32 is preferably releasably held in the hole in the sleeve 37 by a pin 41 in the keyway or groove 30. This pin 41 is positioned so that when the sleeve is in the position shown in Fig. 3 the bent end 40 of the key may be sprung out of the hole in the sleeve and the key may be removed without detaching the sleeve from the shaft 14, for inspecting or replacing said key. Any other suitable means may be employed for connecting the desired gear to the countershaft 14.

By the described construction a very simple and compact change speed mechanism is produced, in which three or more gears are arranged in a space usually occupied by a less number of gears. Moreover no shifting of the gears up or down, or into and out of mesh is required.

I claim as my invention:

1. In a change speed mechanism for drilling machines, the combination of a shaft, upper, lower, and intermediate gears loosely arranged on said shaft, a second shaft, gears secured on said second shaft and in mesh with said first mentioned gears, a keyway in each of said upper, lower, and intermediate gears, a frame having an arm adjacent said upper gears and through which said first named shaft passes, a longitudinal groove in the gear receiving portions of said first mentioned shaft and extending upwardly a distance above said frame arm, a sleeve slidably keyed on said shaft above said arm, a key movably arranged in said groove and having a part adapted to enter the keyway in either of said upper, lower or intermediate gears, a stop on said first mentioned shaft for limiting the movement of said sleeve in one direction, and said arm limiting the movement of said sleeve in the opposite direction, said key having a part detachably engaging a part of said sleeve, a pin in said groove adapted to bear against said key and maintain it in engagement with said sleeve in either position of said key, and means in said groove for yieldingly holding said key part in the keyways of either of said upper, lower or intermediate gears.

2. In a change speed mechanism for drilling machines, the combination of a shaft, upper, lower, and intermediate gears loosely arranged on said shaft, a second shaft, gears secured on said second shaft and in mesh with said first mentioned gears, a keyway in each of said upper, lower, and intermediate gears, a frame having an arm adjacent said upper gears and through which said first named shaft passes, a longitudinal groove in the gear receiving portions of said first mentioned shaft and extending upwardly a distance above said frame arm, a sleeve slidably keyed on said shaft above said arm, a key movably arranged in said groove and having a part adapted to enter the keyway in either of said upper, lower or intermediate gears, stops for limiting the movement of said sleeve in either direction on said first mentioned shaft, said key having an offset part adapted to enter a hole in said sleeve so as to be detachably secured thereto, a pin in said groove adapted to bear against said key to hold said offset part in the hole in said sleeve, said pin being positioned to permit the key to be detached from said sleeve when desired, and means in said groove for yieldingly holding said key part in the keyways of either of said upper, lower or intermediate gears.

Witness my hand this 17th day of October, 1919.

JOHN E. MANQUEN.

Witnesses:
CHAS. BURGIN,
J. M. DOBMEIER.